United States Patent [19]
Wong et al.

[11] Patent Number: 5,885,645
[45] Date of Patent: Mar. 23, 1999

[54] SEPARATELY MILLING NUT SOLIDS AND PARTICULATE WATER SOLUBLE SOLIDS TO REDUCE STICKNESS AND IMPROVE FLAVOR INTENSITY OF NUT SPREAD

[75] Inventors: Vincent York-Leung Wong; Richard Joseph Sackenheim, both of Hamilton, Ohio

[73] Assignee: The Procter & Gamble Company, Cincinnati, Ohio

[21] Appl. No.: 879,355

[22] Filed: Jun. 20, 1997

Related U.S. Application Data

[63] Continuation of Ser. No. 706,587, Sep. 5, 1996, Pat. No. 5,667,838.

[51] Int. Cl.$^6$ .................................................. A23L 1/38
[52] U.S. Cl. .................. 426/633; 426/518; 426/650; 426/654; 426/661
[58] Field of Search .................... 426/633, 650, 426/654, 518, 661

[56] References Cited

U.S. PATENT DOCUMENTS

| | | | |
|---|---|---|---|
| 1,696,766 | 12/1928 | Howe. | |
| 3,317,325 | 5/1967 | Durst | 99/126 |
| 3,619,207 | 11/1971 | Dzurik et al. | 99/128 |
| 4,000,322 | 12/1976 | Billerbeck et al. | 426/72 |
| 4,004,037 | 1/1977 | Connick | 426/324 |
| 4,273,795 | 6/1981 | Bosco et al. | 426/602 |
| 4,329,375 | 5/1982 | Holloway, Jr. et al. | 426/632 |
| 4,814,195 | 3/1989 | Yokoyama et al. | 426/633 |
| 4,828,868 | 5/1989 | Lasdon et al. | 426/633 |
| 5,079,027 | 1/1992 | Wong et al. | 426/633 |
| 5,230,919 | 7/1993 | Walling et al. | 426/633 |
| 5,302,409 | 4/1994 | Franklin | 426/633 |
| 5,433,970 | 7/1995 | Wong et al. | 426/633 |
| 5,490,999 | 2/1996 | Villagran et al. | 426/633 |
| 5,508,057 | 4/1996 | Wong et al. | 426/633 |
| 5,518,755 | 5/1996 | Wong et al. | 426/633 |

FOREIGN PATENT DOCUMENTS

| | | |
|---|---|---|
| 0 021 483 A | 6/1980 | European Pat. Off. . |
| 0 518 507 A | 5/1992 | European Pat. Off. . |
| 2 007 961 | 11/1978 | United Kingdom . |

*Primary Examiner*—Helen Pratt
*Attorney, Agent, or Firm*—Melody A. Jones; Gerry S. Gressel; Karen F. Clark

[57] ABSTRACT

Nut spreads, especially peanut butters, having a relatively low viscosity of about 2000 centipoise or less that have significantly reduced stickiness and increased nut flavor intensity. These nut spreads are obtained by milling a mixture of nut solids, oil, particulate water-soluble solids such as sugar and salt, optionally but preferably nut butter stabilizer and emulsifier, such that the water soluble solids have a mean particle size of about 20 microns or less to reduce grittiness. This milled mixture is combined with a nut paste prepared without excessively reducing the particle size of the nut solids.

11 Claims, No Drawings

SEPARATELY MILLING NUT SOLIDS AND PARTICULATE WATER SOLUBLE SOLIDS TO REDUCE STICKNESS AND IMPROVE FLAVOR INTENSITY OF NUT SPREAD

This is a continuation of application Ser. No. 08/706,587, filed on Sept. 5, 1996 now U.S. Pat. No. 5,667,838.

TECHNICAL FIELD

This application relates to nut spreads, especially peanut butters, having reduced stickiness. This application further relates to nut spreads, especially peanut butters, having improved flavor intensity.

BACKGROUND OF THE INVENTION

Conventional peanut butter and other nut butters typically comprise cohesive, comminuted mixtures of solid nut particles suspended in oil (nut paste), a sweetener such as sugar, high fructose corn syrup or honey, salt and a stabilizing agent (e.g., a high melting point fat or hardstock) to prevent separation of the oil and particulates. The primary component of peanut butter, peanut paste, is formed by roasting, blanching, and grinding shelled peanuts. During the grinding step, the cellular structure of the peanuts is ruptured, releasing the peanut oil in which the pulverized peanut solids become suspended.

There are a number of factors that consumers consider in evaluating the desirability of peanut butter. One is its "stickiness" perception. The consumer perceives "stickiness" as the adhesion to the roof of the mouth of the mass of ingested peanut butter, as well as the effort it takes for the tongue to remove it therefrom. However, what the consumer senses as "stickiness" is not due primarily to adhesive forces, but instead to the cohesiveness of the mass of peanut butter as it is worked on jointly by chemical (saliva) and physical (tongue) forces in the mouth. Indeed, "stickiness" decreases as the saliva and tongue reduces the viscosity of this mass of peanut butter to the point that it can be easily swallowed.

Another factor considered by consumers is "peanut flavor" perception. The mechanism by which peanut flavor is released is believed to be due to the hydration of the nut solids in the mouth by saliva. While the total amount of peanut flavor present in the nut solids is important, it appears that the ability to effectively hydrate these nut solids primarily affects peanut flavor intensity. Indeed, the more uniform the hydration of these nut solids, the more intense will be the perceived peanut flavor.

Prior efforts to reduce the stickiness perception of peanut butter without adversely affecting peanut flavor intensity have generally been unsuccessful. In the past, there has usually been a trade off between stickiness reduction and peanut flavor intensity, i.e., increases in peanut flavor also increase stickiness and vise versa. For example, chunky type peanut butters made with larger peanut granules have more peanut flavor compared to creamy style peanut butters. However, the processing conditions that create these larger particle size peanut solids generally lead to stickier peanut butters because of increases in viscosity. Conversely, fine grinding of the nut solids (i.e., reducing the particle size) disperses flavor components throughout the nut paste, thus decreasing the flavor impact of these nut solids.

The viscosity of the peanut butter is affected primarily by the particle size distribution (PSD) of the nut solids. Peanut butters made by milling the nut solids to a monomodal particle size distribution have relatively lower viscosities. See U.S. Pat. No. 5,079,207 (Wong et al), issued Jan. 7, 1992 (roll milling nut solids to a monodispersed/monomodal particle size distribution). Conversely, a coarser grind results in a more viscous peanut butter because the nut solids exist in a polymodal particle size distribution, resulting in an increase in particle packing behavior and a greater tendency under stress of the nut particles to collide with each other. Another reason for the higher viscosity of polymodal PSD peanut butters is that coarse grinding of the nuts ruptures fewer oil cells, resulting in less free oil in the nut solid suspension.

To reduce stickiness, the viscosity of the peanut butter needs to be reduced. This can be achieved by increasing the amount of shear imparted to the nut paste and/or decreasing the particle size of the nut solids. A high pressure or multiple pass homogenization of the peanut paste has typically been used to achieve the necessary size reduction and shear. See, for example, U.S. Pat. No. 3,619,207 (Dzurik et al), issued Nov. 9, 1971 which describes one such high pressure homogenization process. Unfortunately, prior attempts to reduce the viscosity of the peanut butter have also led to a significant reduction in peanut flavor intensity. This has been attributed to a reduction in the residence time in the mouth of the mass of ingested peanut butter. This shorter in-mouth residence time decreases the peanut flavor intensity because the solids are hydrated to a lesser extent. In addition, high pressure or multiple pass homogenization often grinds the nut solids to such a fine size that a significant portion of the peanut flavor volatiles originally present are lost.

Another factor affecting consumer acceptability of peanut butter is its grittiness impression. Grittiness occurs when the solid particles in the peanut butter are of a sufficient size and appropriate geometry that the tongue can sense them. Solids that can impart grittiness include not only the peanut solids, but also other non-fat solids that are typically present in the peanut butter, especially water soluble solids such as sugar and salt. One way to reduce this grittiness impression is by simply passing the mixture of peanut paste and other non-fat solids through a high pressure homogenizer to reduce all the solids to a finer size. See U.S. Pat. No. 5,518,755 (Wong et al), issued May 21, 1996. However, as noted before, this also adversely impacts the peanut flavor intensity of the resulting peanut butter because of the size reduction that occurs in the peanut solids.

Accordingly, it would be desirable to be able to formulate a peanut butter that: (1) reduces the stickiness impression; (2) does not adversely affect peanut flavor intensity; and (3) reduces grittiness.

DISCLOSURE OF THE INVENTION

The present invention relates to nut spreads, especially peanut butters, having reduced stickiness, yet with surprisingly improved nut flavor. These nut spreads have a viscosity of about 2000 centipoise or less (measured at $6.8 \sec_{-1}$) and comprise:

a. from about 25 to about 60 nut solids having particle size distribution such that:
  (1) from about 3 to about 10% of the nut solid particles are greater than about 38 microns;
  (2) from about 1 to about 7% of the nut solid particles are greater than about 75 microns;
  (3) from about 0.3 to about 6% of the nut solid particles are greater than about 150 microns;
  (4) from about 0.1 to about 3% of the nut solid particles are greater than about 250 microns;

b. from about 5 to about 25% of a particulate water-soluble components having an mean particle size of about 20 microns or less and selected from flavorants, flavor enhancers, bulking agents and mixtures thereof;

c. optionally, but preferably a nut butter stabilizer; and d. optionally, but preferably an emulsifier.

The present invention further relates to a process for making these nut spreads. This process comprises the steps of:

a. forming a mixture consisting essentially of:
   (1) up to about 15% nut solids;
   (2) from about 5 to about 75% oil;
   (3) from about 5 to about 75% of a particulate water-soluble component selected from flavorants, flavor enhancers, bulking agents and mixtures thereof; and
   (4) optionally, but preferably a nut butter stabilizer; and
   (5) optionally, but preferably an emulsifier;

b. milling the mixture of step (a) such that the water-soluble component has an mean particle size of about 20 microns or less; and c. combining the milled mixture of step (b) with a nut paste comprising from about 25 to about 60% nut solids having particle size distribution such that:
   (1) from about 3 to about 10% of the nut solid particles are greater than about 38 microns;
   (2) from about 1 to about 7% of the nut solid particles are greater than about 75 microns;
   (3) from about 0.3 to about 6% of the nut solid particles are greater than about 150 microns;
   (4) from about 0.1 to about 3% of the nut solid particles are greater than about 250 microns;

wherein the weight ratio of nut paste to milled mixture is from about 3:1 to about 7:1 to provide a nut spread having a viscosity of about 2000 centipoise or less (measured at 6.8 sec$^{-1}$).

The nut spreads and especially peanut butters of the present invention have significantly reduced stickiness compared to prior peanut butters. This is achieved by greatly reducing the viscosity of the nut spread, i.e., to about 2000 centipoise or less. This viscosity reduction is obtained by a combination of two factors: (1) high shear mixing of the peanut paste; and (2) adding oil to the nut spread formulation, typically through a premix containing the particulate water-soluble components such as sugar and salt. The greatly reduced viscosity of the nut spreads of the present invention means significantly less work has to be imparted to the ingested nut spread mass in order to shear thin it and make it easy to swallow. This is perceived as a reduction in stickiness of the nut spread.

Surprisingly, this stickiness reduction in the nut spreads of the present invention does not result in a loss in nut flavor intensity. Indeed, nut spreads prepared according to the present invention can have increased nut flavor intensity compared to conventional nut spreads. This is achieved by forming the nut paste under conditions that: (1) do not excessively reduce the particle size of the nut solids; and (2) do not excessively strip desired nut volatiles from the nut solids and/or oil that comprise the nut paste. Also, because of the greatly reduced viscosity of the nut spread, the release of nut flavors is more intense because the nut solids are hydrated faster (due to an increase in in-mouth mixing efficiency), even though the in-mouth residence time for hydration of the nut solids is less relative to conventional nut butters and nut spreads.

An important factor in being able to reduce stickiness in the nut spreads of the present invention, yet at the same time intensify the nut flavor, is at least partially due to the surprising discovery that the nut solids do not have to be milled to a high degree of fitness in order for the nut spread to taste creamy (i.e., not gritty). Instead it was discovered that grittiness is primarily due to the particulate water-soluble solids present in the nut spread, especially the particulate water-soluble flavorants and flavor enhancers such as sugar and salt. These particulate water-soluble solids are sensed as gritty because they have hard, angular shapes with sharp corners and are audible as they are broken down in the process of eating the nut spread. Because of this surprising discovery, it has been found that it is most important to finely mill only the water soluble solids (i.e., to a mean particle size of about 20 microns or less) to reduce grittiness. This allows the nut paste to be separately formed under conditions that reduce its viscosity (and stickiness) but do not excessively (and undesirably) reduce the particle size of the nut solids or strip nut flavor volatiles.

The ability to separately mill the particulate water-soluble solids provides advantageous formulation and processing flexibility. For example, the particulate water-soluble solids such as sugar and salt can be finely milled, along with the oil, optionally a small amount of nut solids, optionally a stabilizer and optionally an emulsifier, to form a premix suitable for combination with nut pastes having different nut solid particle size distributions and prepared under a variety of processing and roasting conditions. This premix can be prepared and stored for future use, or can be shipped to remote sites for combination with nut pastes prepared at these remote sites to provide nut spreads according to the present invention.

DETAILED DESCRIPTION OF THE INVENTION

A. Definitions

As used herein, the term "nut spread" means a spreadable food product made primarily from nut solids and fat/oil, plus other ingredient such as nut butter stabilizers, flavorants, flavor enhancers, bulking agents, emulsifiers, etc. Nut spreads include, but are not limited to, "nut butters" and "peanut butters" as these terms are defined by the standards of identity of the Food and Drug Administration.

As used herein, the term "total fat" refers to the total amount of fat and oil present in the nut spread. While the terms "fat" and "oil" are used somewhat interchangeably, the term "fat" usually refers to triglycerides (and their corresponding substitutes) that are solid or plastic at ambient temperature, while the term "oil" usually refers to triglycerides (and their corresponding substitutes) that are liquid or fluid at ambient temperature.

As used herein, the term "comprising" means various components can be conjointly employed in the nut spreads of the present invention and that various steps can conjointly employed in preparing these spreads. Accordingly, the terms "consisting essentially of" and "consisting of" are embodied in the term comprising.

All amounts, ratios, parts and percentages used herein are based on weight unless otherwise specified.

B. Nut Solids. Nut Paste and Fats/Oils

A primary ingredient of the nut spreads according to the present invention are the nut solids that are derived from nuts and oil seeds. While the present invention will be often be described in terms of nut solids derived from peanuts, it should be understood that other sources of nut solids such as almonds, pecans, walnuts, cashews, filberts, macadamia nuts, Brazilians, hazel nuts, sunflower seeds, sesame seeds, pumpkin seeds and soybeans can be used as well. Mixtures of these nut solids can also be used.

The flavor of the nut paste can be that of the natural (raw) nut or is more typically developed by subjecting the nuts to a thermal operation, usually roasting. For example, peanuts can be roasted in a hot air convection roaster (e.g., a Jet Zone roaster manufactured by Wolverine). The flavor character and intensity are controlled by the roast temperature and the roast time.

Generally, roasting peanuts at a higher roast temperature and shorter time has resulted in the most desirable peanut flavor. However, there is a limit to the amount of peanut flavor that can be developed by this approach. Roasting peanuts at higher temperatures cause a non-uniform temperature profile and in turn a non-uniform flavor profile within the peanut. It is this non-uniformity in flavor (darker roast outside and lighter roast inside) that creates a more desirable peanut flavor relative to peanuts roasted to the same color but at a lower roast temperature. However, because of the non-uniform roasting profile within the peanut, roasting to a darker roast color to further intensify peanut flavor can cause over-roasting of the outer peanut to occur, leading to burnt notes.

A way to intensify peanut flavor while minimizing burnt notes caused by over-roasting is to combine peanuts roasted separately to various roast colors. It was discovered that a combination of light and dark roasted peanuts resulted in a more intense and preferred peanut flavor character. The combination of a light and dark roast fraction simulates the flavor profile developed within a peanut that is roasted at high roast temperatures. This flavor profile can be easily manipulated by varying the proportion of peanuts roasted to different roast colors. Moreover, peanut flavor perception can also be manipulated by controlling the grind size of the various roasted peanut fractions. For example, peanuts roasted to a darker roast color can be milled to a very fine particle size without losing flavor because of the low volatility of the flavors generated during roasting. Conversely, peanuts roasted to a lighter color should be milled to a larger particle size because of the high volatility of the flavors generated during roasting.

The nut spreads according to the prevent invention comprise from about 25 to about 60% nut solids, preferably from about 35 to about 55% nut solids; most preferably from about 40 to about 50% nut solids. These nut solids are typically dispersed or suspended in oil derived from the respective nut that is commonly referred to as a "nut paste." The oil used in the nut spreads is typically that which naturally comes from the nut or seed during the formation of the nut paste. However, oils such as soybean oil, palm oil, cottonseed oil, coconut oil, walnut oil and other suitable edible oils can also be used, in whole or in part, in making the nut spreads of the present invention. Preferably, peanut oil expressed during formation of the peanut paste is the primary oil used in making peanut butters according to the present invention. For nut spreads made from other nuts and oil seeds, such as the sunflower seeds, mixtures of oils can be preferred for flavor.

Low calorie and zero calorie fat and oil substitutes, such as sucrose polyesters of long chain fatty acid (olestra) and other polyol polyesters of fatty acids, can be used in making these nut spreads. See, for example, U.S. Pat. No. 3,600,186 (Mattson et al.) issued Aug. 17, 1971; U.S. Pat. No. 5,422,131 (Elsen et al) issued Jun. 6, 1995; U.S. Pat. No. 5,419,925 (Seiden et al), issued May 30, 1995; U.S. Pat. No. 5,071,669 (Seiden), issued Dec. 10, 1991, all of which are incorporated by reference. Mixed triglycerides made from medium and long chain saturated and/or unsaturated fatty acids can also be used as the fat/toil herein. See, for example, U.S. Pat. No. 5,288,512 (Seiden), issued Feb. 22, 1994, which is incorporated by reference. Oils that contain medium chain triglycerides can also be used be used as the fat/oil source. See U.S. Pat. No. 4,863,753 (Hunter et al), issued Sept. 5, 1989, which is incorporated by reference.

The nut paste can be made by comminuting nuts using any conventional grinder such as Bauer mill, Urschel or Fitzmill that provides an oil continuous suspension, reduces the viscosity of the paste, but does not excessively reduce the particle size of the nut solids or strip nut flavor volatiles. The particle size of the nut solids is carefully controlled to maximize peanut flavor and minimize grittiness. This is achieved in the present invention by grinding the nut paste such that a higher percentage of the nut solids have larger particle sizes. For nut pastes of the present invention, the particle size distribution is such that: (1) from about 3 to about 10% (preferably from about 4 to about 10%, most preferably from about 5 to about 8%) of the nut solid particles are greater than about 38 microns; (2) from about 1 to about 7% (preferably from about 2 to about 6%, most preferably from about 2 to about 4%) of the nut solid particles are greater than about 75 microns; (3) from about 0.3 to about 6% (preferably from about 0.5 to about 5%, most-preferably from about 0.75 to about 3%) of the nut solid particles are greater than about 150 microns; (4) from about 0.1 to about 3% (preferably from about 0.1 to about 2.5%, most preferably from about 0.1 to about 1.5%) of the nut solid particles are greater than about 250 microns. These nut pastes typically have a bimodal particle size distribution, i.e., the nut solids form two different particle distribution curves that overlap.

The total fat present (obtained during comminution of the nuts or by separate fat/oil addition) in the nut spreads of the present invention can vary widely depending upon the viscosity desired, the fat level desired and like factors. If desired, the total fat present can be such as to satisfy the standard of identify for nut spreads, such as peanut butter. Nut spreads of the present invention typically comprise from about 42 to about 60% total fat. Nut spreads of the present invention preferably comprise from about 45 to about 55%, most preferably from about 48 to about 53%, total fat.

C. Particulate Water-Soluble Components

The nut spreads of the present invention also comprise from about 5 to about 25%, preferably from about 5 to about 10%, particulate water-soluble solid components. These particulate water water-soluble solids can be selected from flavorants, flavor enhancers, bulking agents, as well as mixtures thereof.

As used herein, the term "flavorant" refers to agents that contribute to the flavor of the nut spread. These include sweeteners, natural and artificial flavors, and other flavorants that contribute to the flavor of the nut spread, including natural or artificial peanut flavors, roasted flavors, praline/caramel flavors, walnut flavors, almond flavors and flavor compositions. Sweeteners can be selected from sugars, sugar mixtures, artificial sweeteners and other naturally sweet materials. Sugars include, for example, sucrose, fructose, dextrose, honey, high fructose corn syrup, lactose, maltose, and maltose syrups. Preferably, the sweetener will have a sweetness intensity the same or similar to that of sucrose or fructose. Sugars are typically included the nut spreads of the present invention at a level of from about 0.5 to about 10%, preferably from about 1 to about 7%.

Artificial sweeteners such as aspartame, acesulfam, saccharine, cyclamate and glycerrhizin can also be used in the nut spreads of the present invention. The amount of artificial sweetener used depends on its sweetness intensity. Typically, these artificial sweeteners are included in amount that provides a sweetness intensity equivalent to the addition of from about 0.5 to about 10%, preferably from about 1% to about 7%, sucrose. Usually from about 0.001% to about 2% artificial sweetener is used.

As used herein, "flavor enhancers" refer to agents that enhance or complement the flavor of the nut spread. Flavor enhancers include salt or salt substitutes such as sodium chloride, potassium chloride, sodium chloride/potassium chloride mixtures, and seasoned salts. The level of flavor enhancer used is a matter of the desired taste level, but usually is from about 0.1 to about 2%, preferably from about 0.5 to about 1.5%, of the nut spread.

The nut spreads of the present invention can also comprise from about 0.01% to about 0.02% citric acid as a flavor enhancer. Preferably from about 0.01% to 0.015% citric acid is used. The addition of citric acid can enhance the roasted nut and especially the roasted peanut butter flavor and saltiness impression, thereby reducing the amount of salt required to give the nuts spreads, especially peanut butters, of the present invention an acceptable flavor. The addition of citric acid, especially in the presence of a metallic ion salt, also allows the nut spread to achieve oxidative stability through chelation of the metal ions by the citric acid.

Particularly preferred flavor systems for use in the nut spreads of the present invention are those involving a combination of sugar and salt. For nut spreads using this preferred flavor system, the sugar is typically present in the spread at a level from about 0.5 to about 10%, preferably from about 1 to about 7%; the level of salt is typically present in the spread at a level of from about 0.1 to about 2%, preferably from about 1 to about 1.5%.

Particulate water soluble bulking agents can also be used in the nut spreads of the present invention. These bulking agents typically add body or texture to the spread and can be non-nutritive or low calorie materials. Suitable bulking agents include corn syrup solids, maltodextrin, dextrose, polydextrose, mono- and disaccharides, starches (e.g., corn, potato, tapioca wheat), as well as mixtures of these agents. Corn syrup solids, polydextrose (from Pfizer Chemicals) and maltodextrin are preferred bulking agents. Sugar substitutes which function like sugars but which are non-nutritive can also be used herein. Such sugar substitutes include the 5-C-hydroxyalkylaldohexoses described in U.S. Pat. No. 5,041,541 (Mazur), issued Aug. 20, 1991.

In order to minimize grittiness, these particulate water-soluble solids need have a relatively fine particle size. Particulate water soluble solids included in the nut spreads of the present invention have a mean particle size of about 20 microns or less. Especially preferred particulate water soluble solids have a mean particle size of about 10 microns or less.

D. Other Solids

Nut spreads of the present invention can comprise solids other than nut solids and particulate water soluble components. These other solids can be present in the nut spreads of the present in combined amounts of up to about 20%, preferably up to about 10%. These other solids can include fibers, such as cellulose, flours (e.g., wheat, rye, pea) and protein supplements such as additional peanut solids, soy flour, soy concentrate, soy isolate, casein, egg whites, and protein from other animal or vegetable sources; or any combination thereof.

E. Nut Butter Stabilizers and Emulsifiers

The nut spreads of the present invention can also optionally but preferably comprise a nut butter stabilizer in effective amounts up to about 5%. Preferably from about 1 to about 3% nut butter stabilizer is used. These nut butter stabilizers can be any of the known peanut butter stabilizers, for example, hydrogenated rapeseed oil, or other hydrogenated triglycerides having a high proportion of $C_{20}$ and $C_{22}$ fatty acids. See for example, U.S. Pat. No. 3,265,507 (Japikse), issued Aug. 9, 1966 and U.S. Pat. No. 3,129,102 (Sanders), issued Apr. 14, 1964), which are incorporated by reference. These stabilizers are usually triglycerides that are solid at room temperature. They solidify in the nut spread in specific crystaline states and keep the oil from separating. These materials can be mixed with a second hydrogenated oil having an iodine value of less than 8, for example hydrogenated palm oil, canola oil, soybean oil, rapeseed oil, cotonseed oil, coconut oil, and similar materials. This stabilizer can also be mixed with lower melting fat fractions as, for example, the peanut butter stabilizer composition disclosed in U.S. Pat. No. 4,341,814 (McCoy), issued Jul. 27, 1982, which is incorporated by reference.

Particularly suitable nut butter stabilizers for nut spreads of the present invention include tailored β' stable hardstocks referred to as "PSP/PSS" hardstocks, as disclosed in U.S. Pat. No. 4,996,074 (Seiden et al), issued Feb. 26, 1991, which is incorporated herein by reference. Highly hydrogenated high erucic acid rapeseed oil shown in Example VI of this patent is an example of a β' tending hardstock particularly suitable for use in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock:high erucic acid rapeseed oil of from about 30:1 to about 10:1, preferably from about 27:1 to about 20:1. The high erucic acid rapeseed oil is more fully discussed in this patent at column 7, line 50 to column 8, line 14.

Emulsifier can also be used in the nut spreads of the present invention to achieve the proper texture. The emulsifier can be any food compatible emulsifier such as mono- and di-glycerides, lecithin, sucrose monoesters, polyglycerol esters, sorbitan esters, polyethoxylated glycols and mixtures thereof Up to about 5% and, preferably from about 0.1 to about 3% emulsifier is used.

F. Other Optional Components

Nut chunks (including defatted nut chunks), flavored or candied bits and other optional components can be included in the nut spreads of the present invention at various levels. These other components include chocolate chips or bits of other flavored bits, e.g., butterscotch and peanuts, jellies (either low calorie jellies or regular jelly or preserves), and praline nuts or other candies. These other components are usually included at levels up to about 20% of the nut spread.

G. Preparation of Nut Spread

The nut spreads of the present invention are preferably prepared by forming a mixture (hereafter referred to as a "premix") consisting essentially of:

(1) up to about 15%, preferably from about 1 to about 10% nut solids;

(2) from about 5 to about 75%, preferably from about 15 to about 50% oil;

(3) from about 5 to about 75%, preferably from about 25 to about 55%, particulate water-soluble components selected from flavorants, flavor enhancers, bulking agents and mixtures thereof;

(4) up to about 15%, preferably from about 1 to about 7%, nut butter stabilizer; and (5) up to about 5%, preferably from about 1 to about 3% emulsifier.

The nut solids used in this premix can be obtained from nut pastes prepared as described above, or from any other art known process for making nut pastes. Any water-soluble solids such as molasses, corn syrup solids, etc., that are to be included in the nut spread are typically and preferably present in this premix. The oil included in the premix can be any of the oils previously mentioned. (In determining the total amount of oil present in the premix, any oil from the nut paste is included in this total.) The oil acts primarily as a processing aid to insure that the particulate water-soluble solids are efficiently milled to the desired fine size. However, an additional benefit of this oil is that it lowers the viscosity of the resultant nut spread when the premix is subsequently combined with the nut paste.

The oil, water soluble solids, stabilizer (optional), nut solids (optional), and emulsifier (optional) are mixed, blended, or otherwise combined together to form the premix. Preferably, as these premix ingredients are added to the mixing tank, a portion of the resulting premix is simultaneously recycled through a colloid mill and then back to the mixing tank. This recycling is generally continued until at least all of the solids have been added to the premix.

After all the premix ingredients have been combined together, the premix is then milled to finely grind the particulate water soluble solids, i.e., to mean particle size of about 20 microns or less, preferably about 10 microns or less. Methods for finely milling this premix include microfluidizers, colloid mills and roll mills. A particularly suitable method for finely grinding the water soluble solids involves passing this premix through a high pressure homogenizer, such as a M-8 APV Gaulin or Rannie Model 1351 homogenizer, at a pressure in the range from about 2,000 to about 14,500 psig. See also U.S. Pat. No. 4,352,573 (Pandolfe), issued Oct. 5, 1982 and U.S. Pat. No. 4,383,769 (Pandolfe), issued May 17, 1983 herein incorporated by reference) for suitable high pressure homogenizers made by APV Gaulin. Preferably, the pressure in the homogenizer is in the range from about 4,000 to about 8,000 psig. The premix can be passed one or more times through the homogenizer to insure that the particulate solids have achieved the desired finer particle size.

This milled premix is then combined, mixed or blended with the nut paste comprising the nut solids having the particle size distribution as previously described. This combined mixture can be subjected to additional high shear mixing, such as by passing the mixture through a colloid mill such as a Greerco colloid mill to reduce the viscosity of the mixture. Typically, the colloid mill is operated with a wide open gap and at 3600 rpm. The nut spread, with or without additional high shear mixing, is then finished by passing it through a deaerator (versator) and a scraped wall heat exchanger to increase the oxidative stability of the nut spread and to set up its crystalline structure. The scraped wall heat exchanger is typically operated such that the freezer outlet temperature is between 97° F. (36° C.) and 100° F. (38° C.). chunks or pieces of nuts can also be added to the finished spread at this point if desired.

Nut spreads prepared according to this process typically have bimodal particle distribution. Nut spreads according to this process will further have a viscosity of about 2000 centipoise or less, preferably about 1800 centipoise or less, most preferably about 1500 centipoise or less, and a Casson yield value of less than about 50 dynes/cm$^2$, preferably less than about 30 dynes/cm$^2$. Casson plastic viscosity of this spread is typically less than about 10 poise, preferably less than about 5 poise.

ANALYTICAL TEST METHODS
1. Viscosity and Casson Yield Value of Nut Pastes and Nut Spreads A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. (149° F.) and all samples are measured at 65° C. (149° F.).

A sample of 14.0 grams of the nut spread or nut paste (unaerated) is placed in the sample cell. The sample cell is then inserted in the jacketed cell holder. To compensate for heat losses through the tubings, etc., the water temperature entering the jacketed cell holder should be a few degress higher than the desired sample temperature of 65° C. (149° F.). After the temperature of the sample has reached 65° C. (149° F.) the sample is pre-sheared for five minutes at 50 rpm. The speed is then changed to 100 rpm and a measurement taken after the dial reading settles to a constant value. A total of five scale readings are recorded for 100, 50, 20, 10 and 5 rpm. In general, the time before reading should be as set forth in Table I.

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17, respectively. A plot of the square root of shear stress vs. the square root of shear rate results in a straight line. Readings where the dial pointer goes off scale are ignored. A least squares linear regression is made over the data to calculate the slope and intercept.

This data is used to calculate two values. The first of these is the plastic viscosity that is equal to the slope of the line squared. The plastic viscosity is a measurement of the viscosity of the nut spread or nut paste at an infinite shear rate. It accurately predicts the resistance to flow in pumping, moving or mixing situations. The Casson plastic viscosity is measured in poise.

The second value is the yield value that is equal to the value of the x intercept (abscissa) squared. The yield value is a measure of amount of force or shear that is necessary to get the nut spread/nut paste to start moving. The yield value is measured in dynes/cm$^2$. The relationship between the plastic viscosity and the yield value determine how a nut spread/nut paste will behave in additional processing.

2. Particle Size Distribution of Nut Solids

Weigh 20 grams (±0.1 gm) of nut (peanut) butter or paste into a 400 ml glass beaker. Add 150 grams (±0.1 gm) of acetone into beaker. Stir the peanut butter/paste and acetone together until the butter/paste is well dispersed in the acetone.

The particle size distribution is determined by measuring the amount of nut solids retained on the following sieves:

| |
|---|
| No. 60 (250 microns) |
| No. 100 (150 microns) |
| No. 200 (75 microns) |
| No. 400 (38 microns) |
| Pan |

The sieves are initially stacked on top of each other in the order of its screen size opening. Thus, the No. 60 sieve is on top followed by the No. 100 sieve and so on with the No. 400 sieve at the bottom of the stack. The smallest nut solids particles are retained by a pan attached at the bottom of the stack of sieves.

The butter/paste dispersion in acetone is poured onto the stack of sieves. Complete removal of all nut solids from the beaker is accomplished by rinsing the beaker three times with acetone and pouring the contents through the stack of screens. Acetone is then gently sprayed on the sieved solids on the No. 60 sieve. This facilitates the screening of particles through this sieve and onto the sieves below. When it appears that all of the finer particles have been removed, the top sieve (No. 60) is removed from the stack and placed on top of a pan. A final rinsing of the nut solids is then made with acetone. At this point, the acetone collected on the pan should be clear and not contain any nut solids. (If there are any nut solids on the pan, they are poured back through the remaining sieves in the stack.) The No. 60 sieve with the retained nut solids is then set aside to dry. About 10 minutes is required for vaporization of all of the acetone. This procedure is then repeated for the remaining sieves.

The nut solids retained on each sieve are weighed. The % particles retained on each sieve is then calculated by dividing the weight retained on the sieve by the initial sting weight (20 gms). Below is a sample calculation:

Initial peanut butter sample weight: 20.00 g
Nut Solids weight on No. 60 sieve: 0.35 g
% particles on No. 60 sieve: 100×0.35/20=1.75%

The determination the particle size distribution of the nut solids by this method is done in duplicate and the average is reported.

EXAMPLES

The following are representative examples of peanut butters and spreads prepared according to the present invention.

Example 1

Peanut butter is prepared from the following total ingredient formulation:

| Ingredients | Wt. % |
|---|---|
| Peanuts | 83.90 |
| Sugar | 5.8 |
| Peanut Oil | 6.45 |
| Salt | 1.2 |
| Molasses | 0.5 |
| Stabilizer* | 1.85 |
| Emulsifier (mono and diglycerides of palmitic and stearic acids) | 0.3 |

*Hardened rapeseed oil blended with hydrogenated soybean oil

Initially, a three hundred pound batch of premix is made from the following ingredients:

| Ingredients | Amount (lbs) | Wt % |
|---|---|---|
| Sugar | 168.93 | 56.31 |
| Salt | 34.95 | 11.65 |
| Emulsifier | 8.14 | 2.91 |
| Peanut oil | 87.38 | 29.13 |

The premix ingredients are mixed together in a 100 gallon Hamilton kettle by using a recycle loop where a portion of the premix is recirculated through a colloid mill and then back to the kettle. After all the solids have been added, the premix is then pumped through a Gaulin homogenizer at 4000 psig. The particles after homogenization have a mean particle size of 10 microns.

Peanut paste is made by comminuting roasted peanuts in a Bauer mill. To make a 300 pound batch of peanut butter, the following ingredients are mixed together in a 100 gallon Hamilton kettle: 251.7 pounds of peanut paste, 30.90 pounds of the premix, 1.5 pounds of molasses, 5.55 pounds of stabilizer and 10.35 pounds of peanut oil. The ingredients are mixed for 30 minutes at 25 rpm. This mixture is then passed through a Greerco colloid mill in order to reduce its viscosity to 1500 centipoise. The mixture is then processed through a deaerator (versator) and a scraped wall heat exchanger to increase the oxidative stability of the peanut butter and to set up its crystalline structure. The scraped wall heat exchanger is operated such that the freezer outlet temperature is between 97° F. (36° C.) and 100° F. (38° C.). Chunks or pieces of nuts can also be added to the finished peanut butter at this point if desired.

The peanut butter has a fat content of about 52%. It has a smooth and creamy texture, reduced stickiness, improved peanut flavor intensity and no grittiness. Photomicrographs show that particulate water soluble solids (sugar, salt) in the peanut butter have an average particle less than 10 microns.

Example 2

Peanut butter that is compositionally the same as that of Example 1 is made by continuously blending peanut paste containing stabilizer and molasses with the premix. Roasted nuts are continuously fed and comminuted with the stabilizer at a ratio of 251.7 parts nuts to 5.55 parts stabilizer (i.e., nuts:stabilizer ratio of 54.35:1). Molasses is then mixed in with this blend at a ratio of 1.5 parts molasses to 257.25 parts combined nuts and stabilizer.

The premix is made by metenng the ingredients into a Readco mixer. The dry ingredients (sugar, salt) and fluid ingredients (peanut oil, emulsifier) are preblended to facilitate metering into the Readco mixer. The dry ingredients comprise 82.86 % sugar and 17.14% salt. The fluid ingredients comprise 95.56% peanut oil and 4.44% emulsifier. The ratio of dry to fluid ingredients is 21.00:20.25. The mixture exiting the Readco is also heated to at least 150° F. (65.6° C.) by circulating hot water/steam through the external jacket of the Readco mixer. This premix is then passed through a APV Gaulin homogenizer at 4000 psig in order to reduce the solids to a mean particle size less than 10 microns. This homogenized premix is co-mixed with the peanut paste/stabilizer/molasses mixture at a ratio of 41.25:258.75 and then passed through a high shear mixer such as a colloid mill(s) or a Greerco tandem pipe line mixer. The number of mixers or passes should be such that the viscosity of the peanut butter is reduced to less than 1500 centipoise. The peanut butter is then processed through the finishing system (i.e., versator and scraped wall heat exchanger) as in Example 1.

Example 3

A peanut butter is prepared from the following total ingredient formulation:

| Ingredients | Wt. % |
|---|---|
| Peanuts | 83.9 |
| Sugar | 5.8 |
| Peanut Oil | 6.45 |
| Salt | 1.2 |
| Molasses | 0.5 |
| Stabilizer* | 1.85 |
| Emulsifier (mono and diglycerides of palmitic and stearic acids) | 0.3 |

*Same as Example 1

A 300 pound batch of premix is made by mixing the following ingredients in a 100 gallon Hamilton kettle:

| Ingredients | Amount (lbs) | Wt % |
|---|---|---|
| Peanut paste | 81.3 | 27.10 |
| Sugar | 141.46 | 47.15 |
| Salt | 29.27 | 10.00 |
| Emulsifier | 7.32 | 2.44 |
| Peanut oil | 40.65 | 14.00 |

The peanut paste is initially charged to the kettle along with the emulsifier and peanut oil. The sugar and salt is then metered into the kettle. A portion of the premix is recirculated through a colloid mill and then back to the kettle. After all the solids have been added, the premix is then passed through an APV Gaulin homogenizer at 4000 psig. The particulate water soluble solids in the premix have a mean particle size of 10 microns.

Peanuts are roasted at 422° F. (217° C.) and blanched and ground in a Bauer Mill to form a peanut paste. To make the peanut butter, the following ingredients are mixed in a 100 gallon Hamilton kettle at 150° F. (65.6° C.): 36.90 lbs premix, 241.70 lbs peanut paste, 5.55 lbs stabilizer, 1.5 lbs molasses and 14.35 lbs peanut oil. This mixture is then processed into peanut butter in the manner described in Example 1. The resultant peanut butter has smooth and creamy (i.e., no grittiness) and has a viscosity (6.8 sec$^{-1}$) of less than 1500 centipoise. The product has good peanut butter flavor intensity and significantly reduced stickiness.

Example 4

A peanut spread is made from the following total ingredient formulation:

| Ingredients | Wt. % |
|---|---|
| Peanuts | 50.0 |
| Sugar | 5.8 |
| Salt | 1.2 |
| Molasses | 0.5 |
| Stabilizer | 1.75 |
| Emulsifier | 0.3 |
| Peanut oil | 22.45 |
| Corn syrup solids | 18.0 |

A 300 pound batch of premix is initially made from the following ingredients:

| Ingredients | Amount (lbs) | Wt. % |
|---|---|---|
| Sugar | 34.8 | 11.6 |
| Salt | 7.2 | 2.4 |
| Molasses | 3.0 | 1.0 |
| Stabilizer* | 10.5 | 3.5 |
| Emulsifier | 1.8 | 0.6 |
| Corn syrup solids | 108.0 | 36.0 |
| Peanut oil | 134.7 | 44.9 |

*Same as Example 1

The above ingredients are mixed in a 100 gallon Hamilton kettle that is heated to 150° F. (65.6° C.). A recirculation loop with a colloid mill is used to facilitate mixing. The premix is then passed through an APV Gaulin homogenizer at 4000 psig in order to reduce the particles to a size of 10 microns or less. The finished product is made by combining 150 lbs of the homogenized premix with 150 lbs of peanut paste. The spread is then finished in the same manner as Example 1.

What is claimed is:

1. A nut spread having a viscosity of about 2000 centipoise or less (measured at 6.8 sec$^{-1}$), which comprises:
    a. from about 25 to about 60% nut solids having particle size distribution such that:
        (1) from about 3 to about 10% of the nut solid particles are greater than about 38 microns;
        (2) from about 1 to about 7% of the nut solid particles are greater than about 75 microns;
        (3) from about 0.3 to about 6% of the nut solid particles are greater than about 150 microns;
        (4) from about 0.1 to about 3% of the nut solid particles are greater than about 250 microns; and
    b. from about 5 to about 25% of a particulate water-soluble component having a mean particle size of about 20 microns or less and selected from the group consisting of flavorants, flavor enhancers, bulking agents and mixtures thereof.

2. The nut spread of claim 1 which has a viscosity of about 1800 centipoise or less (measured at 6.8 sec$^{-1}$), a Casson yield value of less than about 50 dynes/cm$^2$, and a Casson plastic viscosity of less than about 10 poise.

3. The nut spread of claim 2 which has a viscosity of about 1500 centipoise or less (measured at 6.8 sec$^{-1}$), a Casson yield value of less than about 30 dynes/cm$^2$, and a Casson plastic viscosity of less than about 5 poise.

4. The nut spread of claim 2 which comprises from about 35 to about 55% peanut solids having a particle size distribution such that:
    (1) from about 4 to about 10% of the nut solid particles are greater than about 38 microns; 2) from about 2 to about 6% of the nut solid particles are greater than about 75 microns;
    (3) from about 0.5 to about 5% of the nut solid particles are greater than about 150 microns;
    (4) from about 0.1 to about 2.5% of the nut solid particles are greater than about 250 microns.

5. The nut spread of claim 4 which comprises from about 40 to about 50% peanut solids having a particle size distribution such that:
    (1) from about 5 to about 8% of the nut solid particles are greater than about 38 microns;
    (2) from about 2 to about 4% of the nut solid particles are greater than about 75 microns;
    (3) from about 0.75 to ab out 3% of the nut solid particles are greater than a bout 150 microns;
    (4) from about 0.1 to about 1.5% of the nut solid particles are greater than aboutl25n 0acrons.

6. The nut spread of claim 2 which comprises from about 42 to about 60% total fat.

7. The nut spread of claim 6 which comprises from about 45 to about 55% total fat.

8. The nut spread of claim 6 which comprises from about 5 to about 10% of said particulate water-soluble solid component having a mean particle size of about 10 microns or less.

9. The nut spread of claim 6 which comprises from about 0.5 to about 10% sugar and from about 0.1 t o about 2% salt.

10. The nut spread of claim 9 which comprises from about 1 to about 7% sugar and from about 1 to about 1.5% salt.

11. 6 The nut spread of claim 9 which further comprises from about 1 to about 3% nut butter stabilizer and from about 0.1 to about 3% emulsifier.

* * * * *

UNITED STATES PATENT AND TRADEMARK OFFICE
CERTIFICATE OF CORRECTION

PATENT NO.   : 5,885,645
DATED        : March 23, 1999
INVENTOR(S)  : Vincent Y. L. Wong et al.

It is certified that error appears in the above-identified patent and that said Letters Patent is hereby corrected as shown below:

Title page,
In the title of the Invention, "*STICKNESS*" should read -- STICKINESS --.

Column 1,
Line 3, "*STICKNESS*" should read -- STICKINESS --.

Column 4,
Line 2, "*fitness*" should read -- finess --.

Column 5,
Line 12, "*unifonnity*" should read -- uniformity --.

Column 8,
Line 8, "*crystaline*" should read -- crystalline --.
Line 12, "*cotonseed*" should read -- cottonseed --.

Column 9,
Line 52, "*C*)." should be -- C) --.

Column 10,
Line 8, "*degres*" should read -- degrees --.

UNITED STATES PATENT AND TRADEMARK OFFICE
CERTIFICATE OF CORRECTION

PATENT NO. : 5,885,645
DATED : March 23, 1999
INVENTOR(S) : Vincent Y. L. Wong et al.

It is certified that error appears in the above-identified patent and that said Letters Patent is hereby corrected as shown below:

Column 11,
Line 19, "*sting*" should read -- starting --.

Column 12,
Line 30, "*metenng*" should read -- metering --.

Column 14,
Line 45, "*ab out*" should read -- about --.
Line 46, "*a bout*" should read -- about --.
Line 48, "*about125n 0acrons*" should read -- about 250 microns --.
Line 58, "*t o*" should read -- to --.
Line 61, before "The," delete "6."

Signed and Sealed this

Twenty-first Day of August, 2001

*Attest:*

NICHOLAS P. GODICI
*Attesting Officer*     Acting Director of the United States Patent and Trademark Office